United States Patent [19]

Kumagai et al.

[11] Patent Number: 4,583,503

[45] Date of Patent: Apr. 22, 1986

[54] APPARATUS FOR CONTROLLING THE ROLLING OF AN ENGINE

[75] Inventors: Naotake Kumagai, Aichi; Minoru Tatemoto, Okazaki; Yoji Itoh, Nagoya; Tokushige Inuzuka, Okazaki, all of Japan

[73] Assignee: Mitsubishi Jidosha Kogyo Kabushiki Kaisha, Tokyo, Japan

[21] Appl. No.: 598,194

[22] Filed: Apr. 9, 1984

[30] Foreign Application Priority Data

Apr. 15, 1983 [JP] Japan .............................. 58-56181[U]
Apr. 15, 1983 [JP] Japan .............................. 58-56183[U]
Apr. 15, 1983 [JP] Japan .............................. 58-56186[U]

[51] Int. Cl.$^4$ ............................................. B60K 5/12
[52] U.S. Cl. ........................... 123/192 R; 123/195 A; 180/312; 188/378; 248/566; 248/636
[58] Field of Search .......... 123/195 R, 195 A, 198 E, 123/192 R, 192 B; 180/312, 300; 248/550, 560, 566, 636; 188/378, 299, 298, 285

[56] References Cited

U.S. PATENT DOCUMENTS

| | | | |
|---|---|---|---|
| 3,645,366 | 2/1972 | Numazawa et al. | 123/340 |
| 4,351,515 | 9/1982 | Yoshida | 248/562 |
| 4,391,435 | 7/1983 | Pham | 248/636 |
| 4,428,569 | 1/1984 | Takei | 248/636 |

FOREIGN PATENT DOCUMENTS

| | | | |
|---|---|---|---|
| 2833776 | 1/1980 | Fed. Rep. of Germany | 180/312 |
| 2916616 | 11/1980 | Fed. Rep. of Germany | 180/300 |
| 3142673 | 5/1983 | Fed. Rep. of Germany | 180/312 |
| 0138424 | 8/1982 | Japan | 180/312 |

Primary Examiner—Craig R. Feinberg
Assistant Examiner—David A. Okonsky
Attorney, Agent, or Firm—Birch, Stewart, Kolasch & Birch

[57] ABSTRACT

A first speed detecting means detects whether the engine speed has fallen below a prescribed level. A second speed detecting means detects whether an accelerator pedal angle has been changed at a speed higher than a predetermined value. A third speed detecting means is provided to detect whether the speed of the automobile is equal to, or higher than, a predetermined value. Upon receipt of the output signals from the first, second and third speed detecting means, a solenoid drive circuit drives engine vibration absorbers for a predetermined period of time. More specifically, the circuit energizes solenoids for this period. The solenoids rotate the thus rotary valves of the absorbers, thus closing the orifices of the absorbers. As a result, the absorbers generate great forces damping the back-and-forth motion of the engine. The vibrations of the engine are therefore not transmitted to the chassis of the automobile.

10 Claims, 5 Drawing Figures

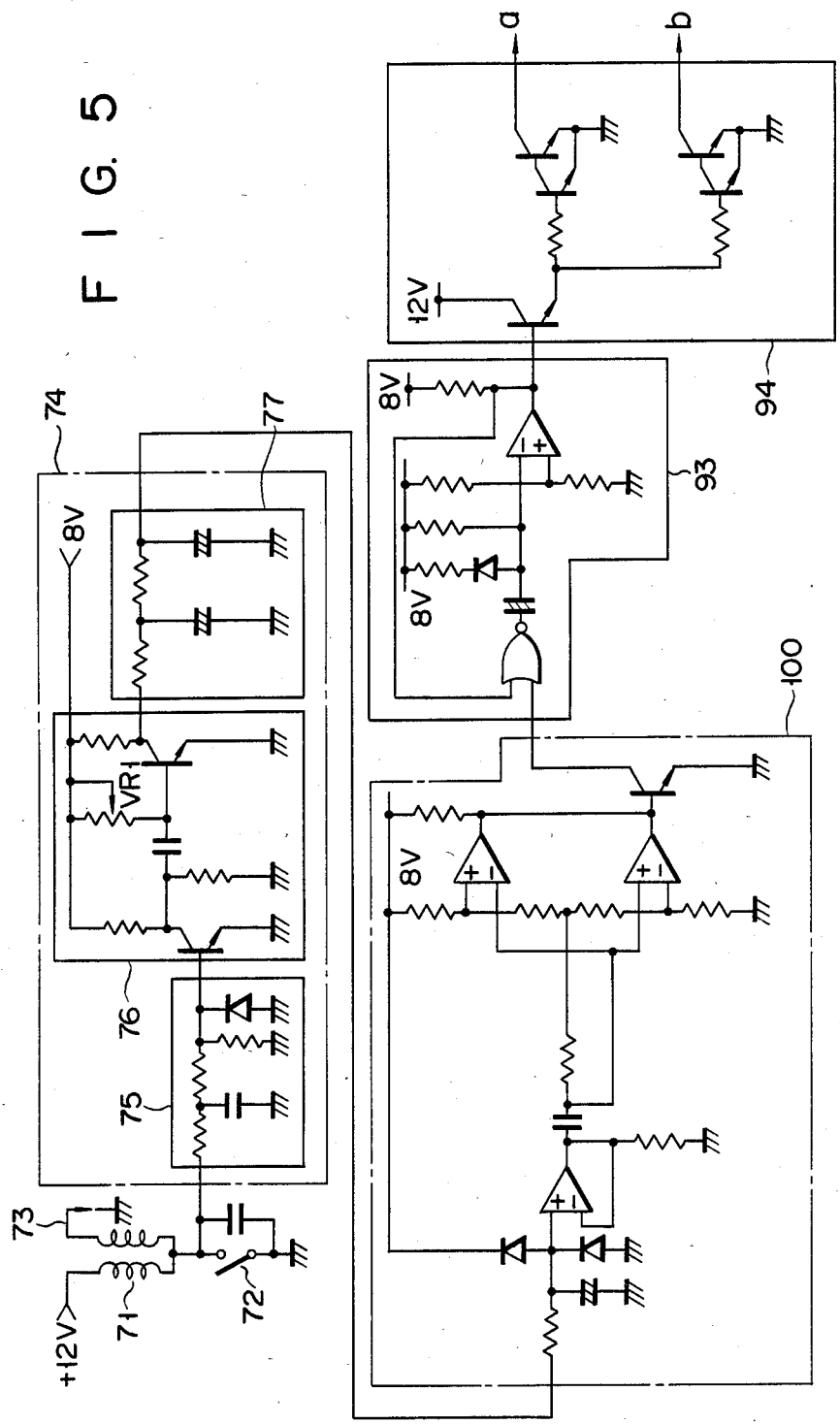
F I G. 5

APPARATUS FOR CONTROLLING THE ROLLING OF AN ENGINE

BACKGROUND OF THE INVENTION

The present invention relates to an apparatus for electronically controlling the rolling of an automobile engine.

The power device of an automobile, including an engine, generates widely different torques when the engine is idle, when the car runs at normal speed and when the transmission is switched to a different mode. When the engine is idle or when the car runs at normal speed, the power device produces a small torque and vibrates at a high frequency and at a low amplitude. When the transmission commences a different operation, the power device produces a noticeably large torque and vibrates at a low frequency and at a high amplitude. If the vibrations are transmitted to the chassis of the automobile, no comfort can be guaranteed to the driver or the passengers. Hence, a shock absorber is provided between the engine and the chassis to reduce the vibrations transmitted to the chassis, thus increasing the occupants' comfort. The conventional shock absorber can indeed absorb high-frequency, low-amplitude vibrations, but fails to absorb low-frequency, high-amplitude vibrations. Consequently, the vibrations of the engine are transmitted to the chassis, failing to give the occupants a comfortable ride.

SUMMARY OF THE INVENTION

It is accordingly the object of this invention to provide an apparatus to electronically control the rolling of an automobile engine which arises when the accelerator pedal is abruptly depressed.

According to the invention, there is provided an apparatus which electronically controls the rolling of an automibile engine. The apparatus comprises: a casing filled with liquid, thus forming a liquid chamber; a partition secured to the engine and dividing said liquid chamber into two sections; fastening means for fastening a wall of said casing which faces the partition to the chassis of the automobile; an orifice member comprising at least one orifice formed in said partition and a rotary spool for adjusting the opening of the orifice; engine-roll control means comprising a drive mechanism for rotating said rotary spool; first speed detecting means for detecting whether the engine speed has fallen below a prescribed level; second speed detecting means for detecting whether an accelerator pedal angle has been depressed at a speed higher than a predetermined value; a mechanism for operating the engine-roll control means; and a drive circuit for driving the engine-roll control means operating mechanism in response to output signals from the first and second speed detecting means.

BRIEF DESCRIPTION OF THE DRAWINGS

FIG. 5 shows the control circuit of another engineroll control apparatus according to the invention.

DETAILED DESCRIPTION OF THE PREFERRED EMBODIMENTS

A few engine-roll control apparatuses embodying this invention may now be described with reference to the accompanying drawings.

Figure 1:
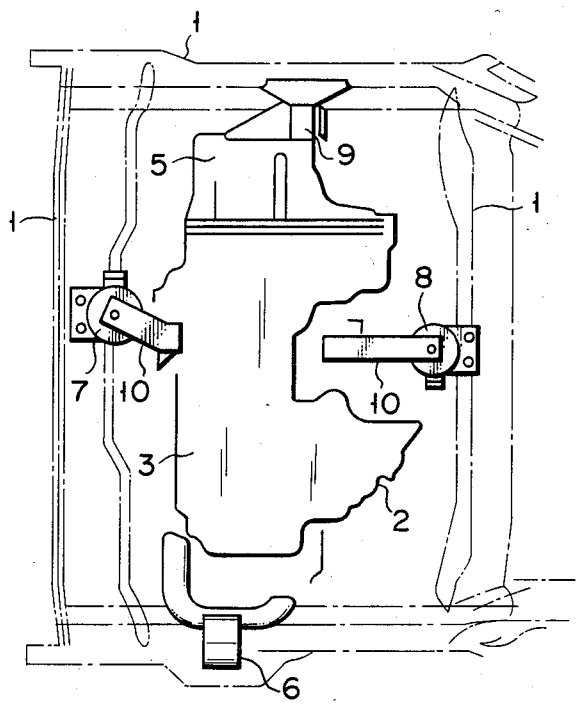
FIG. 1 shows that section of a forward-engine front-wheel-drive automobile (hereinafter called "an FF car") in which an engine is arranged.
Figure 2:
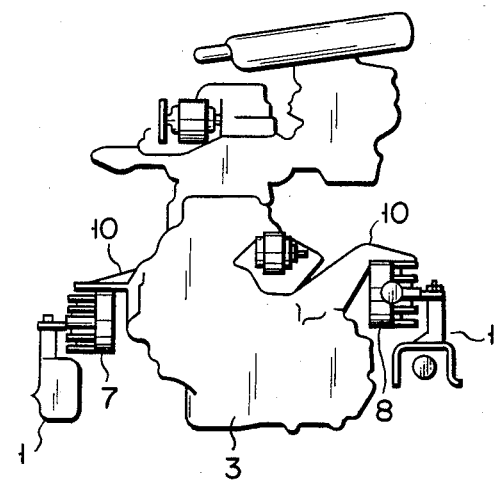
FIG. 2 is a side view of the section shown in FIG. 1.

FIGS. 1 and 2 show a power device 2 mounted on a chassis 1. The power device 2 comprises an engine 3 and an automatic transmission 5. The engine 3 is supported by first and second shock absorbers 7, 8, an engine mount 6 and an transmission mount 9. The shock absorbers 7 and 8 are usually called "front rolling stopper" and "rear rolling stopper", respectively. They have the same structure, but only the first shock absorber 7 will be described with reference to FIG. 3.

Figure 3:
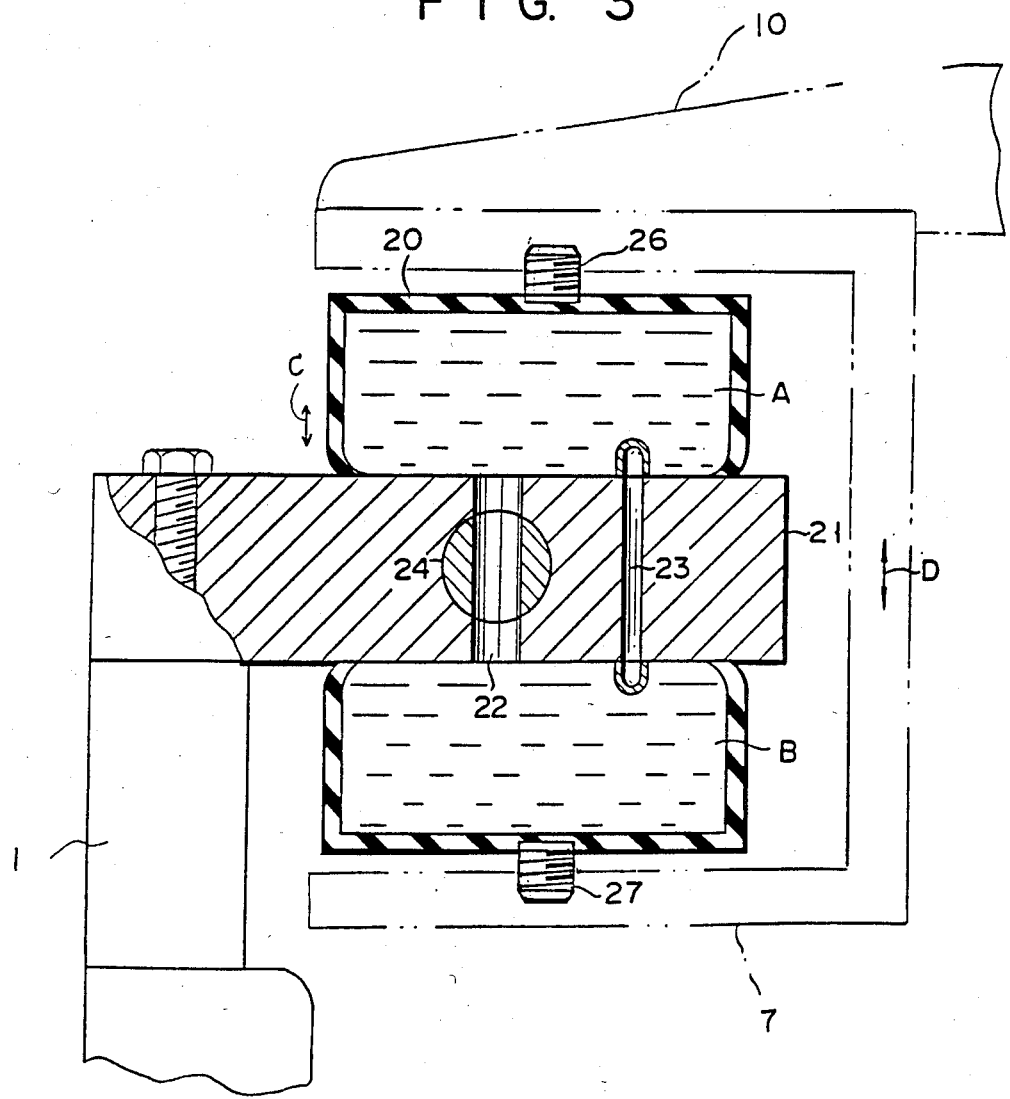
FIG. 3 explains how a shock absorber used in this invention operates.

As shown in FIG. 3, the shock absorber 7 comprises a casing 20 made of elastic material. The casing 20 is divided by a partition 21 into two chambers A and B. The chambers A, B are filled with operation oil. The partition 21 has two through holes, or first and second orifices 22, 23. The first orifice 22 has an inner diameter much larger than that of the second orifice 23. A rotary valve 24 is provided in the first orifice 22. When a solenoid (not shown) is energized, the valve 24 is turned to an angle of 90°, thereby closing the first orifice 22. An arm 10 is connected at one end to the engine 3 and at the other to the housing of shock absorber 7. It moves in the direction of arrow C when the engine 3 undesirably moves back and forth. The walls of the chambers A, B which face the partition 21 are secured to the housing of shock absorber 7 by screws 26, 27. When the engine 3 happens to move back and forth due to some shock, the partition 21 similarly moves back and forth in the direction of arrow D. If, in this case, the rotary valve 24 is rotated, thus closing the first orifice 22, the operation oil will flow from the chamber A to the chamber B, and vice versa, only through the second orifice 23. As a result, greater pressure is applied to the partition 21. This lessens the motion of the partition wall 21 in the direction of arrow D. Consequently, it is possible to suppress the similar motion of the engine 3 which is connected by the arm 10 to the partition 21 and thus moves interlockingly with the partition 21. In contrast, when the rotary valve 24 is rotated, thus opening the first orifice 22, the oil runs through both orifices 22 and 23. In this case, the partition 21 undergoes no high pressure and therefore smoothly moves in conformity to the back-and-forth motion of the engine 3.

Figure 4:
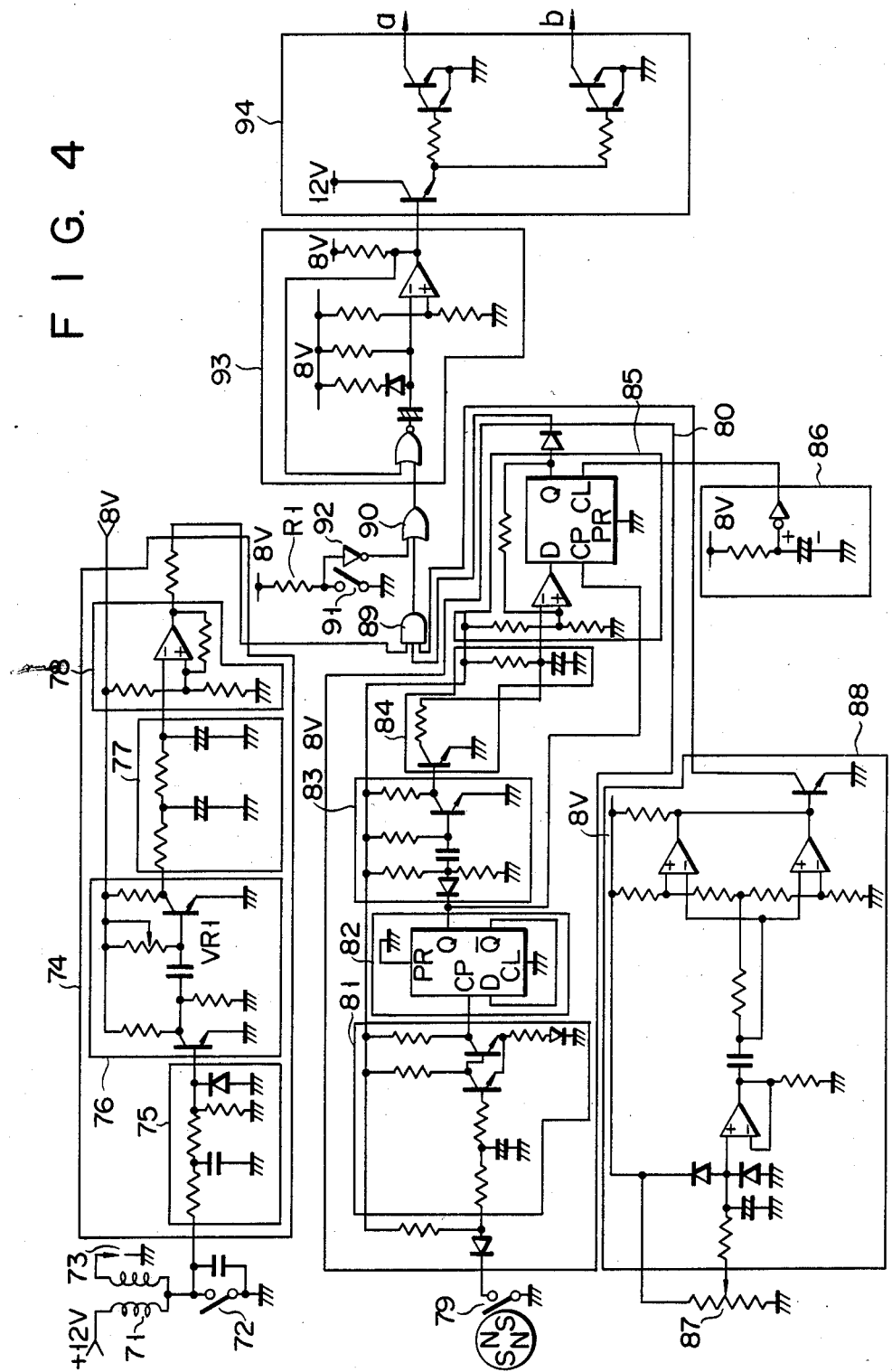
FIG. 4 shows the control circuit of an engine-roll control apparatus according to this invention.

FIG. 4 shows a control circuit used in a first embodiment of the present invention. As shown in this figure, an ignition coil 71 is connected at one end to an ignition plug 73. The other end of the coil 71 is connected to a power source (12 V). The connection point between the coil 71 and plug 73 is connected to a contact breaker 72. The contact breaker 72 is repeatedly turned on and off as the engine shaft rotates. Each time the breaker 72 is closed, high voltage is applied to the ignition plug 73 to produce sparks in the engine cylinder. As this voltage is applied to the plug 73, a signal appears at the connection point between the coil 71 and breaker 72. This signal is supplied to an engine speed detecting circuit 74. The circuit 74 generates voltage proportional to the engine speed. It includes a wave-shaping circuit 75, a pulse width-shaping circuit 76, a low-pass filter 77 and a comparator 78. The circuit 75 converts the input voltage to a pulse signal whose frequency corresponds to the engine speed, and also remove noise from the input voltage. The pulse width-shaping circuit 76 changes the pulse signal from the circuit 75 to a signal with a constant pulse width. The pulse signal from the circuit 76 is supplied to the low-pass filter 77, which outputs voltage corresponding to the engine speed. This voltage is applied to the comparator 78. The comparator 78 produces a high-level signal when the engine speed is below a reference value, i.g., 3,000 rpm.

A car speed sensor 79 generates a car speed pulse signal whose frequency corresponds to the detected car speed. This pulse signal is supplied to a vehicle speed detecting circuit 80. The circuit 80 includes a waveshaping circuit 81, a frequency divider 82, a pulse width-shaping circuit 83, a timer 84 and a comparator 85. The circuit 81 modifies the waveform of the car speed pulse signal. The pulsel signal from the circuit 81 is input to the frequency divider 82, which divides the frequency of the input signal by two. The output signal of the frequency divider 82 is supplied to the circuit 83, which produces a pulse signal with a constant width. This pulse signal is supplied via the timer 84 to the comparator 85 and compared with a reference frequency. When the car speed is 3 km/h or more, the comparator 85 outputs a high-level signal. When a power source is closed, a power source resetting circuit 86 supplies a reset signal to the clear terminal CL of a D-type flip-flop which is incorporated in the comparator 85.

A sensor 87 detects the opening of the throttle valve which is actuated when the accelerator pedal is depressed. The sensor generates a signal representing this speed, which is input to an accelerator depressing speed detecting circuit 88. The detecting circuit 88 produces a high-level signal when the throttle opening speed is over a predetermined value as in case when the driver quickly depresses the accelerator pedal.

The output signals of the detecting circuits 74, 80 and 88 are supplied to an AND gate 89. The output of the AND gate 89 is coupled to one of the two input terminals of an OR gate 90. A clutch switch 91, which is closed when the clutch is coupled to the power device 2, is connected at one end to the ground. Voltage 8 V, is applied to the other end of the switch 91 through a resistor R1. The connecting point between the resistor R1 and switch 91 is connected by an inverter 92 to the other input terminal of the OR gate 90. The output of the OR gate 90 is coupled to a timer 93. Upon receipt of a high-level signal, the timer 93 outputs a signal at high level for a predetermined period of time. This signal is coupled to a solenoid drive circuit 94. The circuit 94 supplies driving signals a and b to the shock absorbers 7 and 8 (FIG. 1), respectively, in response to a high-level input signal.

The first embodiment operates in the following manner. As long as the engine speed is equal to, or higher than, the reference value, i.e., 3,000 rpm, the output signal of the engine speed detecting circuit 74 is at low level. As long as the car speed is lower than the reference value, i.e., 3 km/h, the output signal of the car speed detecting circuit 80 is at low level. As long as the throttle opening speed is lower than the predetermined value, the output signal of the detecting circuit 88 is at low level. When at least one of the output signals from the detecting circuits 74, 80 and 88 is at low level, the AND gate 89 outputs a low-level signal. In this case, the timer 93 also generates a low-level signal. Thus, the solenoid drive circuit 94 is not actuated, producing neither a drive signal a nor a drive signal b. Hence, both chambers A and B of either shock absorber communicate via both orifices 22 and 23. The shock absorbers 7 and 8 provide small damping effects on the back-and-forth motion of the engine 3. Nonetheless, these forces are large enough to absorb the vibrations of the engine 3 which are relatively small since the car speed and accelerator pedal depressing speed are below the reference values.

On the other hand, when the engine speed is below 3,000 rpm, the output signal of the engine speed detecting circuit 74 is at high level. When the car speed is 3 km/h or more, the output signal of the car speed detecting circuit 80 is at high level. When the throttle opening speed is equal to, or higher than, the predetermined value, the output signal of the detecting circuit 88 is at high level. When all output signals from these detecting circuits 74, 80 and 88 are at high level, the AND gate 89 outputs a high-level signal, which is supplied to the timer 93. Therefore, the timer 93 produces a high-level signal for a predetermined period of time. The solenoid drive circuit 94 produces drive signals a and b for this period. In response to the signals a and b, the rotary valve 24 of either shock absorber (FIG. 1) rotates 90°. Thus, the first orifice 22 is closed, so that the two chambers A and B can communicate only via the second orifice 23. The shock absorbers 7 and 8 thus provide generator forces damping the back-and-forth motion of the engine 3 for the predetermined period of time. In short, when the engine speed is lower than 3,000 rpm, the car speed is 3 km/h or more and the throttle opening speed is equal to, or higher than, the predetermined value, the vibrations of the engine 3 are relatively large because the engine 3 creates a great torque, and yet the shock absorbers 7 and 8 can absorb these large vibrations. Hence, the vibrations are not transmitted to the chassis 1.

When the clutch is not coupled to the power device 2, the clutch switch 91 is off. In this case, voltage V1, i.e., a high-level signal, is applied to the inverter 92. The inverter 92 supplies a low-level signal to the timer 93. The timer 93 outputs a low-level signal to the solenoid drive circuit 94. The circuit 94 thus produces neither a drive signal a nor a drive signal b. In this situation, with the clutch not coupled to the power device 2, the chambers A and B of either shock absorber communicate via both orifices 22 and 23. Both shock absorbers 7 and 8 thus generates small forces to damp the back-and-forth motion of the engine 3. These forces are strong enough to absorb the vibrations of the engine which are small since the engine is idling. The vibration are not transmitted to the chassis 1.

When the clutch is coupled to the power device 2 after a gear change has been effected, the clutch switch 91 is turned on, whereby a signal of ground level (i.e., low level) is supplied to the inverter 92. The inverter 92 outputs a high-level signal to the timer 93. The timer 93 produces an high-level signal for a prescribed period of time. During this period, the solenoid driving circuit 94 generates drive signals a and b. Thus, the first orifice 22 of either shock absorber (FIG. 1) is closed, so that the chambers A and B communicate via only the second orifice 23. Both shock absorbers 7 and 8 thus provide great forces to damp the back-and-forth motion of the engine 3, for said period. In short, when the clutch is coupled subsequent to a gear change, the shock absorbers 7 and 8 create large forces to absorb the large vibrations of engine 3. The vibrations of the engine 3, which are large due to the large torque the power device 2 has made, are not transmitted to the chassis 1.

As described above, in the first embodiment, when the engine speed is lower than a reference value (i.e., 3,000 rpm), the car speed is equal to, higher than, a reference value (i.e., 3 km/h) and the throttle opening speed is equal to, or higher than, a predetermined value, subsequent to the coupling of the clutch, the rolling of the engine 3, which is large due to the large torque of the power device 2, can be effectively damped by the absorbers 7 and 8 for a predetermined period of time.

FIG. 5 shows a control circuit used in a second embodiment of the present invention. As shown in this figure, an ignition coil 71 is connected at one end to an ignition plug 73. The other end of the coil 71 is connected to a power source (12 V). The connection point between the coil 71 and plug 73 is connected to a contact breaker 72. The contact breaker 72 is turned on and off repeatedly as the engine shaft rotates. Each time the breaker 72 is closed, high voltage is applied to the ignition plug 73 to produce sparks in the engine cylinder. As this voltage is applied to the plug 73, a signal appears at the connection point between the coil 71 and breaker 72. This signal is supplied to an engine revolution detecting circuit 74. The circuit 74 provides a voltage proportional to the engine speed. It includes a wave-shaping circuit 75, a pulse width-shaping circuit 76 and a low-pass filter 77. The circuit 75 converts the input voltage to a pulse signal whose frequency corresponds to the engine speed, and also remove noise from the input voltage. The pulse width-shaping circuit 76 changes the pulse signal from the circuit 75 to a signal with a constant pulse width. The pulse signal from the circuit 76 is supplied to the low-pass filter 77, which outputs voltage corresponding to the engine speed. This voltage is applied to an engine revolution changing rate detecting circuit 100. The circuit 100 provides an high-level signal to a timer 93 when the changing rate of the engine revolution exceeds a predetermined value. Upon receipt of a high-level signal, the timer 93 outputs a signal at high level for a predetermined period of time. This signal is coupled to a solenoid drive circuit 94. The circuit 94 supplies drive signals a and b to the shock absorbers 7 and 8 (FIG. 1), respectively, in response to a high-level input signal.

The second embodiment operates in the following manner. The engine revolution detecting circuit 74 generates voltage proportional to the engine speed. This voltage is supplied to the engine revolution changing rate detecting circuit 100, which detects a change in engine speed. When this change is below a predetermined value, the engine speed detecting circuit 100 outputs a low-level signal to the timer 93. Thus, the solenoid drive circuit 94 generates neither a drive signal a nor a drive signal b. Hence, both chambers A and B of either shock absorber communicate with one another via both orifices 22 and 23. The shock absorbers 7 and 8 provide small damping effects on the back-and-forth motion of the engine 3. Nonetheless, these forces are large enough to absorb the vibrations of the engine 3 which are relatively small since the change in engine speed is blow the predetermined value.

On the other hand, when the change in engine speed exceeds the predetermined value, the engine revolution changing rate detecting circuit 100 outputs a high-level signal for a predetermined period of time. During this period, the solenoid drive circuit 94 produces drive signals a and b. In response to the signals a and b, the rotary valve 24 of either shock absorber (FIG. 1) rotates 90°. Thus, the first orifice 22 is closed, so that the two chambers A and B can communicate only via the second orifice 23. The shock absorber 7 and 8 thus provide great forces to damp the back-and-forth motion of the engine 3 for the predetermined period of time. In short, when the change in engine speed exceeds the predetermined value, the vibrations of the engine 3 are relatively large because the power device 2 creates a great torque, and yet the shock absorbers 7 and 8 can absorb these large vibrations. Hence, the vibrations are not transmitted to the chasis 1.

As mentioned above, in the second embodiment of the invention, when the change in engine speed exceeds the predetermined value, the rolling of the engine 3, which is large due to the large torque of the engine 3, can be effectively damped by the absorbers 7 and 8 for a predetermined period of time.

The present invention is not limited to the embodiments described above. For instance, the accelerator pedal depressing speed detecting circuit 88 may be replaced by a circuit which detects the throttle opening speed.

What is claimed is:

1. An apparatus for electronically controlling rolling of an automobile engine, comprising:
    a casing filled with liquid, thus forming a liquid chamber;
    a partition secured to the engine and dividing said liquid chamber into two sections;
    fastening means for fastening a wall of said casing which faces the partition to a chassis of an automobile;
    an orifice member comprising at least one orifice formed in said partition and a rotary spool for adjusting the opening of the orifice;
    engine-roll control means comprising a drive mechanism for rotating said rotary spool;
    first speed detecting means for detecting whether the engine speed has fallen below a prescribed level;
    second speed detecting means for detecting whether an accelerator pedal has been depressed at a speed higher than a predetermined value;
    a mechanism for operating the engine-roll control means; and
    a drive circuit for driving the engine-roll control means operating mechanism in response to output signals from the first and second speed detecting means.

2. The apparatus according to claim 1, wherein said drive circuit actuates said mechanism for a predetermined period of time in response to the output signals from said first and second speed detecting means.

3. The apparatus according to claim 2, wherein clutch state detecting means is provided to detect a state of a clutch of the automobile, and said drive circuit actuates said engine-roll control means operating mechanism in response to the output signals from the first, second speed detecting means and said clutch state detecting means.

4. The apparatus according to claim 1, wherein third speed detecting means is provided to detect whether ground speed of the automobile is at least equal to a predetermined value, and said drive circuit actuates said engine-roll control means operating mechanism in response to the output signals from the first, second and third speed detecting means.

5. An apparatus for electronically controlling rolling of an automobile engine, comprising:
- a casing filled with liquid, thus forming a liquid chamber;
- a partition secured to a chassis of an automobile and dividing said liquid chamber into two sections;
- fastening means for fastening a wall of said casing which faces the partition to the engine;
- an orifice member comprising at least one orifice formed in said partition and a rotary spool for adjusting the opening of the orifice;
- engine-roll control means comprising a drive mechanism for rotating said rotary spool;
- a mechanism for operating said engine-roll control means;
- first speed detecting means for detecting whether the engine speed has fallen below a prescribed level;
- second speed detecting means for detecting whether an accelerator pedal has been depressed at a speed higher than a predetermined value; and
- a drive circuit for driving said engine-roll control means operating mechanism in response to output signals from the first and second speed detecting means.

6. The apparatus according to claim 5, wherein third speed detecting means is provided to detect whether ground speed of the automobile is at least equal to a predetermined value, and said drive circuit actuates said engineroll control means operating mechanism in response to the output signals from the first, second and third speed detecting means.

7. The apparatus according to claims 4 or 6, wherein said drive circuit actuates said engine-roll control means operating mechanism for a predetermined period of time in response to the output signals from said first, second and third speed detecting means.

8. The apparatus according to claim 7, wherein clutch state detecting means is provided to detect a state of a clutch of the automobile, and said drive circuit actuates said engine-roll control means operating mechanism in response to the output signals from the first, second, and third speed detecting means and said clutch state detecting means.

9. An apparatus for electronically controlling rolling of an automobile engine, comprising:
- a casing filled with liquid, thus forming a liquid chamber;
- a partition secured to the engine and dividing said liquid chamber into two sections;
- fastening means for fastening a wall of said casing which faces the partition to a chassis of an automobile;
- an orifice member comprising at least one orifice formed in said partition and a rotary spool for adjusting the opening of the orifice;
- engine-roll control means comprising a drive mechanism for rotating said rotary spool;
- a mechanism for operating said engine-roll control means;
- speed detecting means for detecting whether a changing rate of engine revolution exceeds a predetermined value; and
- a drive circuit for driving said engine-roll control means operating mechanism for a predetermined period of time in response to output signals from said speed detecting means.

10. An apparatus for electronically controlling rolling of an automobile engine, comprising:
- a casing filled with liquid, thus forming a liquid chamber;
- a partition secured to a chassis of an automobile and dividing said liquid chamber into two sections;
- fastening means for fastening a wall of said casing which faces the partition to the engine;
- an orifice member comprising at least one orifice formed in said partition and a rotary spool for adjusting the opening of the orifice; and
- engine-roll control means comprising a drive mechanism for rotating said rotary spool;
- a mechanism for operating said engine-roll control means;
- speed detecting means for detecting whether a changing rate of engine revolution exceeds a predetermined value; and
- a drive circuit for driving said engine-roll control means operating mechanism for a predetermined period of time in response to output signals from said speed detecting means.

* * * * *